United States Patent
Brandwine et al.

(10) Patent No.: US 9,473,386 B1
(45) Date of Patent: Oct. 18, 2016

(54) SELECTIVE DISTRIBUTION OF ROUTING INFORMATION

(71) Applicant: Amazon Technologies, Inc., Reno, NV (US)

(72) Inventors: Eric Jason Brandwine, Haymarket, VA (US); Swaminathan Sivasubramanian, Seattle, WA (US); Bradley E. Marshall, Bainbridge Island, WA (US); Tate Andrew Certain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 20 days.

(21) Appl. No.: 14/142,538

(22) Filed: Dec. 27, 2013

Related U.S. Application Data

(63) Continuation of application No. 12/894,702, filed on Sep. 30, 2010, now Pat. No. 8,619,780.

(51) Int. Cl.
  *H04L 12/28* (2006.01)
  *H04L 12/751* (2013.01)
  *H04L 12/741* (2013.01)

(52) U.S. Cl.
  CPC ........... *H04L 45/025* (2013.01); *H04L 45/745* (2013.01)

(58) Field of Classification Search
  None
  See application file for complete search history.

(56) References Cited

U.S. PATENT DOCUMENTS

| | | | |
|---|---|---|---|
| 6,067,574 A * | 5/2000 | Tzeng | 709/247 |
| 7,058,639 B1 | 6/2006 | Chatterjee et al. | |
| 7,088,681 B2 | 8/2006 | Ladegaard | |
| 7,139,838 B1 | 11/2006 | Squire et al. | |
| 7,382,731 B1 * | 6/2008 | Zhao et al. | 370/236 |
| 7,668,119 B2 | 2/2010 | Thubert et al. | |
| 7,787,450 B1 | 8/2010 | Chan et al. | |
| 8,014,302 B2 | 9/2011 | Wang | |
| 8,230,063 B2 | 7/2012 | Shi et al. | |
| 2003/0117954 A1 | 6/2003 | De Neve et al. | |
| 2005/0091261 A1 | 4/2005 | Wu et al. | |
| 2006/0256769 A1 | 11/2006 | Cho et al. | |
| 2007/0025355 A1 | 2/2007 | Cohen et al. | |
| 2007/0064690 A1 | 3/2007 | Karpagavinayagam | |
| 2007/0162595 A1 | 7/2007 | Samprathi | |
| 2007/0242607 A1 | 10/2007 | Sadler et al. | |

(Continued)

OTHER PUBLICATIONS

Flich et al., "An Efficient Implementation of Distributed Routing Algorithms for NoCs *," 2008, Second ACM/IEEE International Symposium on Networks-on-Chip.

*Primary Examiner* — Dang Ton
*Assistant Examiner* — Ronald H Davis
(74) *Attorney, Agent, or Firm* — Knobbe, Martens, Olson & Bear, LLP

(57) ABSTRACT

A distributed system for collecting and processing packet routing information is provided. A service provider, such as a content delivery network service provider, can maintain multiple Points of Presence ("POPs"). Routing computing devices associated with each POP can forward information about the packet routing information to a packet routing management component. The packet routing component can process the information provided by the various POPs. The packet routing component can then update, or otherwise modify, packet routing information used by one or more of the POPs. Accordingly, the packet routing management component can then selectively distribute the updated or modified packet routing information, including the distribution to all POPs, the targeted distribution to specific POPs and the creation of centrally accessible routing information.

20 Claims, 8 Drawing Sheets

(56) References Cited

U.S. PATENT DOCUMENTS

| | | |
|---|---|---|
| 2007/0280136 A1 | 12/2007 | Chen et al. |
| 2008/0267189 A1* | 10/2008 | Li .................................. 370/392 |
| 2009/0006607 A1 | 1/2009 | Bu et al. |
| 2009/0164783 A1 | 6/2009 | Solis et al. |
| 2009/0259847 A1 | 10/2009 | Li |
| 2011/0188503 A1 | 8/2011 | Hewson |

\* cited by examiner

SELECTIVE DISTRIBUTION OF ROUTING INFORMATION

CROSS-REFERENCE TO RELATED APPLICATION

This application is a continuation of U.S. patent application Ser. No. 12/894,702, entitled PROCESSING PACKET ROUTING INFORMATION, and filed Sep. 30, 2010, the disclosure of which is incorporated herein by reference in its entirety.

BACKGROUND OF THE INVENTION

Generally described, computing devices utilize a communication network, or a series of communication networks, to exchange data. In a common embodiment, data to be exchanged is divided into a series of packets that can be transmitted between a sending computing device and a recipient computing device. In general, each packet can be considered to include two primary components, namely, control information and payload data. The control information corresponds to information utilized by one or more communication networks to deliver the payload data. For example, control information can include source and destination network addresses, error detection codes, and packet sequencing identification, and the like. Typically, control information is found in packet headers and trailers included within the packet and adjacent to the payload data.

In practice, in a packet-switched communication network, packets are transmitted between multiple physical networks, or sub-networks. Generally, the physical networks include a number of hardware devices that receive packets from a source network component and forward the packet to a recipient network component. The packet routing hardware devices are typically referred to as routers. Routers can operate with two primary functions or planes. The first function corresponds to a control plane, in which the router learns the set of outgoing interfaces that are most appropriate for forwarding received packets to specific destinations. The second function is a forwarding plane, in which the router sends the received packet to an outbound interface.

To execute the control plane functionality, routers maintain various packing routine information that identifies, among other things, packet attribute information, destination information, cost information for at least a subset of possible network addresses, such as Internet Protocol ("IP") addresses. Typically, routers can maintain a routing table, or Routing Information Base ("RIB") that include the packet routing information for a number of network addresses. Additionally, routers can also maintain a Forwarding Information Base ("FIB") that include packet routing information for a smaller subset of network address. FIBs are typically optimized for faster lookup by a router. Utilizing locally maintained RIBs, FIBs or other routing tables, routers can receive and forward incoming packets.

In some embodiments, the status of a router or the availability of portions of the communication network accessible to a router may change. For example, a router may begin operating at less than optimal rates based on a volume of packets received and processed by the router. In another example, one or more portions of a communication network may experience hardware or software failures that prevent data communication. Based on dynamically changing conditions/availability, generally referred to as "Internet weather," routers can utilize protocols, such as Border Gateway Protocol ("BGP") to communicate general availability within a communication network or changes in availability of portions of a communication network. Based on the communicated availability, receiving routers can then update and reconfigure the locally maintained packet routing information, such as the RIB and FIB. Such updating mechanisms, however, can experience propagation delays and result in inefficient packet routing.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure corresponds to packet routing in a communication network. Specifically, the present disclosure corresponds to a distributed system for collecting and processing packet routing information. In one embodiment, a service provider, such as a content delivery network service provider, can maintain multiple Points of Presence ("POPs"). Each POP can include one or more routing computing devices, such as routers, that facilitate the receipt and forwarding of packets within a communication network. In turn, each routing computing device (or sets of routing computing device) maintain or access packet routing information, such as a RIB, FIB, or other routing tables. Based on processing data packets, the routing computing devices make modifications to their respective packet routing information.

In addition to routing data packets to and from the POPs, the routing computing devices (or other computing device associated with the POP) can forward information about the packet routing information used by the POP to a packet routing management component. In an illustrative embodiment, the information can include at least portions of the routing tables. Additionally, the information can include information representative of the routing tables, such as a hash tree of the RIB or FIB. The packet routing component can process the information provided by the various POPs. The packet routing component can then update, or otherwise modify, the packet routing information used by one or more of the POPs. Additionally, the packet routing management component can then selectively distribute the updated or modified packet routing information, including the distribution to updated routing tables to all POPs, the targeted distribution of the updated routing tables to specific POPs and the creation of a centrally accessible routing tables for at least a subset of POPs.

Various implementations, combination and applications for implemented an illustrative routing environment will be described in accordance with the distributed routing environment. However, one skilled in the relevant art will appreciate that such embodiment and examples are illustrative in nature and should not be construed as limiting.

Figure 1:
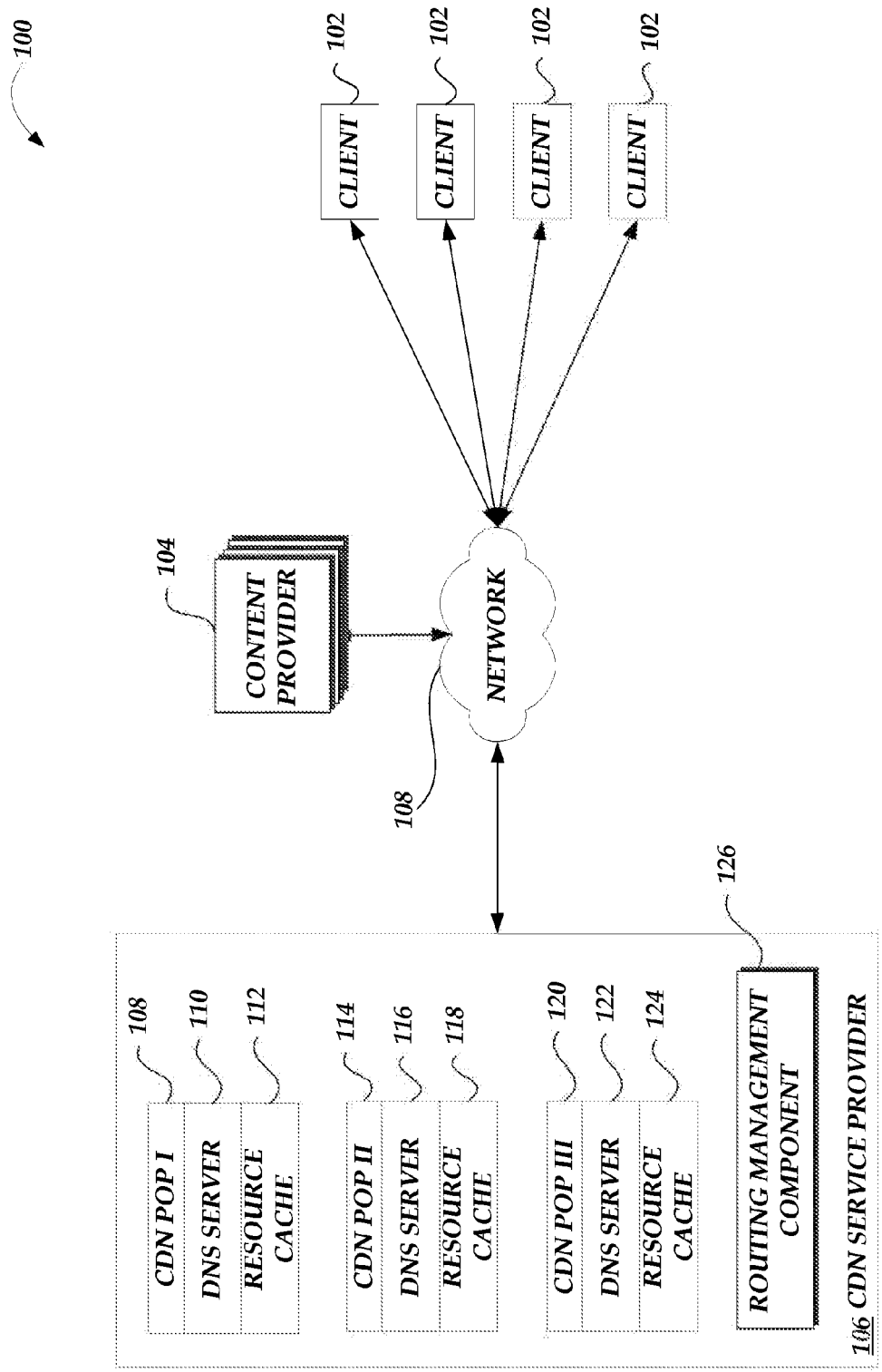
FIG. 1 is a block diagram illustrative of one embodiment of a packet routing environment including a content delivery network service provider, one or more content providers and one or more client computing devices.

FIG. 1 is a block diagram illustrative of a packet routing environment 100 for the management and processing of content requests. As illustrated in FIG. 1, the packet routing environment 100 includes a number of client computing devices 102 (generally referred to as clients) for requesting content from a content provider and/or a CDN service provider. In an illustrative embodiment, the client computing devices 102 can corresponds to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

The packet routing environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include web server components corresponding to one or more server computing devices for obtaining and processing requests for content (such as Web pages) from the client computing devices 102. The content provider 104 can further include origin server components and associated storage components corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the packet routing environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of POPs locations 108, 114, 120 that correspond to nodes on the communication network 108. Each POP 108, 114, 120 includes a DNS component 110, 116, 122 made up of a number of DNS server computing devices for resolving DNS queries from the client computers 102. Each POP 108, 114, 120 also includes a resource cache component 112, 118, 124 made up of a number of cache server computing devices for storing resources from content providers and transmitting various requested resources to various client computers. The DNS components 110, 116, 122 and the resource cache components 112, 118, 124 may further include additional software and/or hardware components that facilitate communications including, but not limited, load balancing or load sharing software/hardware components. The CDN service provider 106 can also include one or more routing management components 126 for maintaining, processing and distributing routing information associated with the POPs 108, 114, 120.

In an illustrative embodiment, the DNS components 110, 116, 122 and the resource cache components 112, 118, 124 are considered to be logically grouped, regardless of whether the components, or portions of the components, are physically separate. Additionally, as previously described, each POP 108, 114, 120 can include one or more routing computing devices, such as routers, that facilitate the receipt and forwarding of packets within a communication network. In turn, each routing computing device (or sets of routing computing devices) maintain or access packet routing tables, such as a RIB or FIB, utilized in the processing of data packets received by or transmitted from the routing computing devices associated with the respective POPs. Accordingly, although the POPs 108, 114, 120 are illustrated in FIG. 1 as logically associated with the CDN Provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With reference now to FIGS. 2-4B, the interaction between various components of the packet routing environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
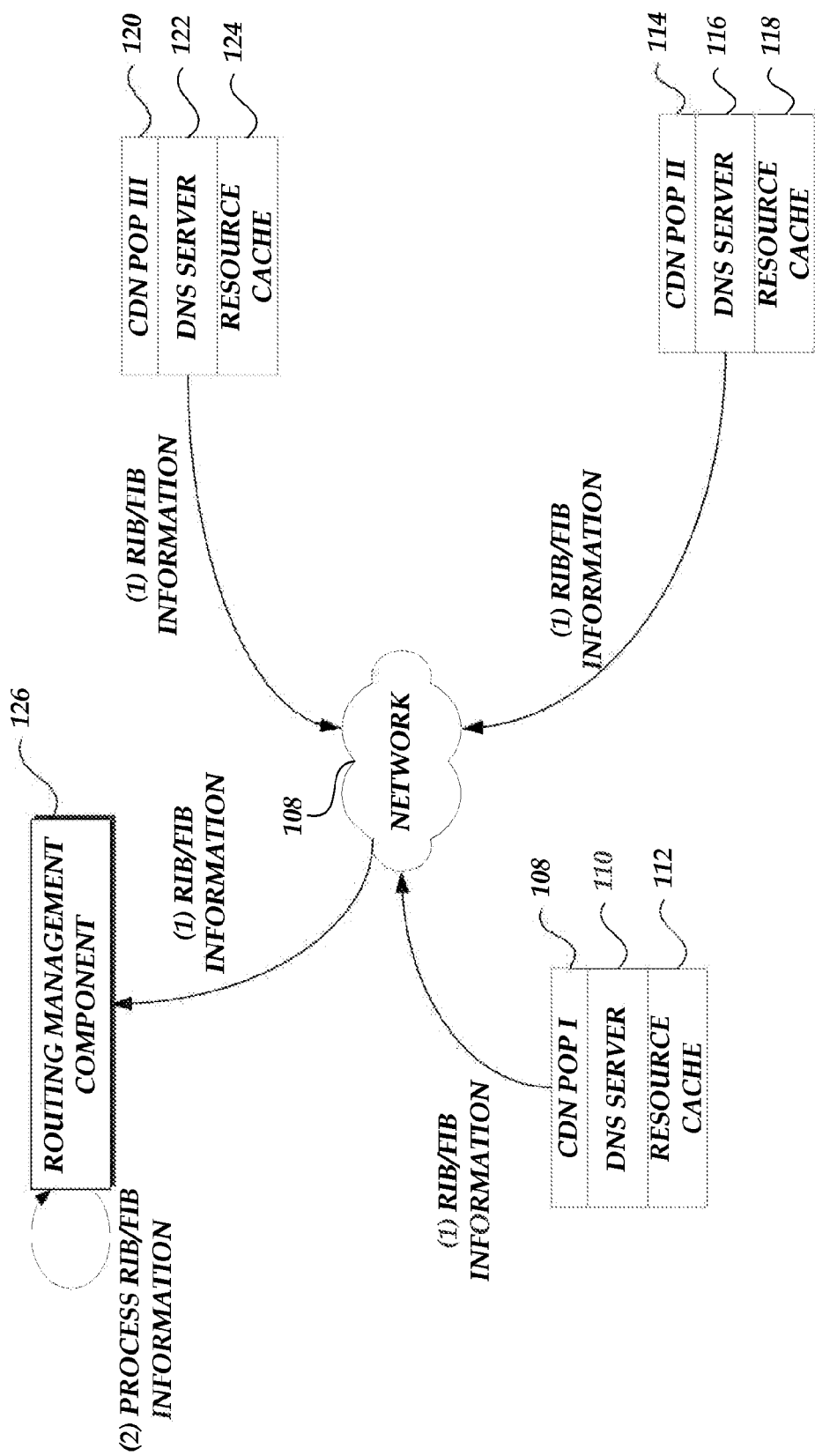
FIG. 2 is a block diagram of the packet routing environment of FIG. 1 illustrative of components of a packet routing environment illustrating the processing of packet routing information.

With reference to FIG. 2, a block diagram of the packet routing environment of FIG. 1 illustrative of components of a packet routing environment illustrating the processing of packet routing information will be described. As previously described, at some point, one or more POPs associated with the CDN service provider 106 obtains updates or modifications to the routing information maintained, or accessed, by each POP. In one embodiment, each POP can transmit the routing information on a periodic basis or upon receiving a request from the routing management component 126. In another embodiment, a POP may only transmit routing information based on a detection of a modification to the routing information maintained by the POP or upon detection of a threshold amount of modifications (in terms of number of changes or type of changes). In this embodiment, POPs would only transmit based on determining some changes or modifications or exceed thresholds related to changes or modification.

The routing management component 126 obtains the various routing information from the POPs and processes the routing information. Specifically, the routing management component 126 processes the routing information maintained for each of the POPs to determine whether routing tables need to be modified, or otherwise updated. In one embodiment, the routing management component 126 can utilize hash trees of the routing information to determine which portions, if any, of the routing information maintained by the POPs has been modified or updated. The processing of the routing information can also include some form of conflict resolution in the event that the processing of the received routing information would result in different values for the updated routing tables. By way of example, the processing of the received routing information can include the modification of various aspects of routing tables maintained for one or more of the POPs. In another example, the processing of the routing information can result in the assessment of future errors or unavailability and modifications in anticipation of the future error or unavailability in a portion of a communication network.

Figure 3:
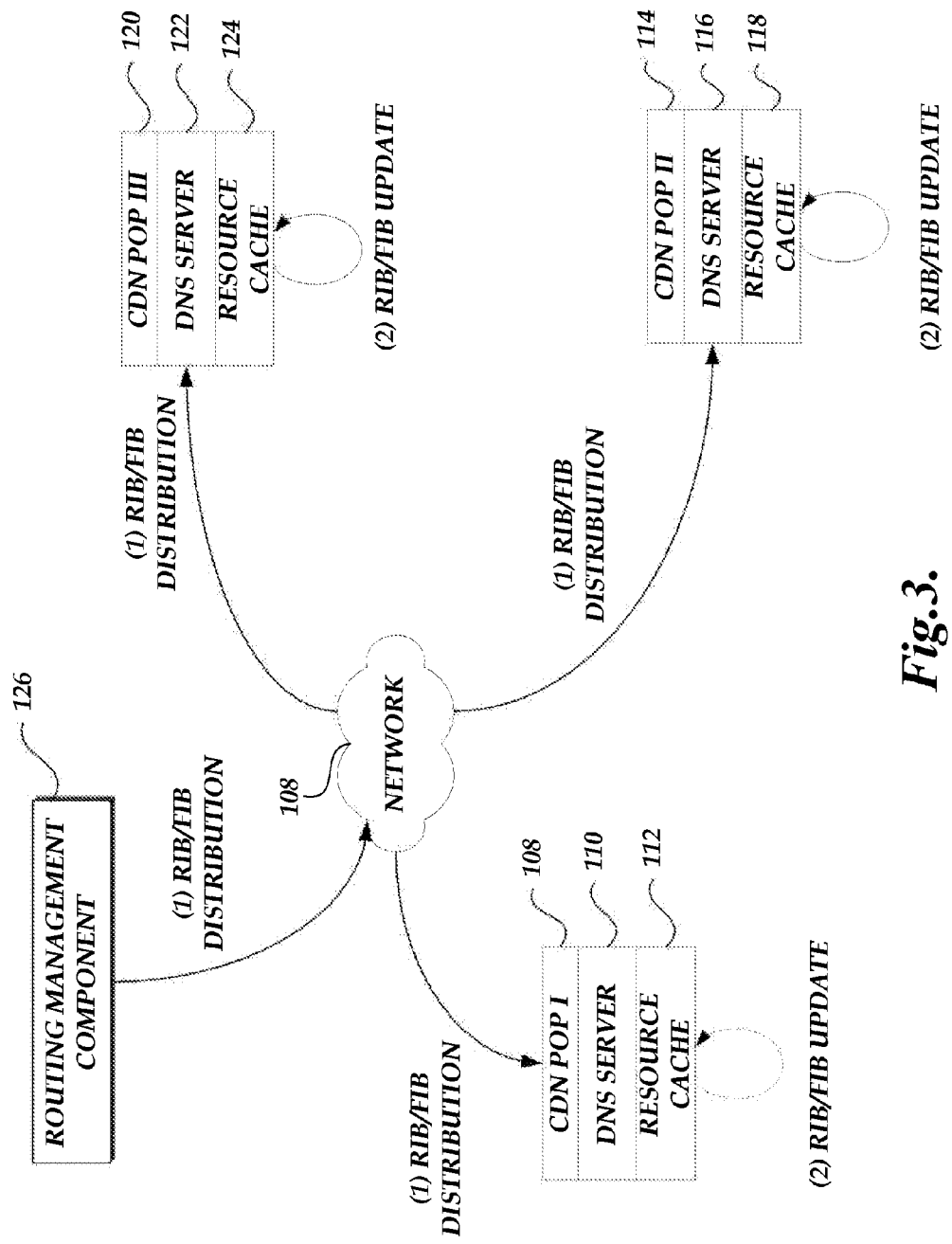
FIG. 3 is a block diagram of the packet routing environment of FIG. 1 illustrative of the distribution of processed packet routing information.

With reference to FIG. 3, upon processing the routing information provided by the POPs, the routing management component 126 can distribute the routing information. In one embodiment, the routing management component 126 can deliver the updated routing information to all the POPs. In another embodiment, the routing management component 126 can selectively target POPs that have been determined to require the updated or modified routing information. Illustratively, the routing management component 126 can make a determination of when a POP is to receive updated routing tables. The routing management component 126 can utilize weighing factors in making such a determination. By way of example, assume that the routing information received by the routing management component 126 is indicative of a perceived failure of a portion of a communication network geographically located on the East Coast. The routing management component 126 would process the updating routing information and determine that the routing tables maintained for all of the POPs, such as RIBs, would need to be updated to reflect the perceived failure. However, the routing management component 126 may determine that only a subset of the POPs geographically on the East Coast and Midwest will receive the updated routing tables and that POP geographically on the West Coast will not receive the updated routing tables until, and unless, some additional criteria are satisfied. In still another embodiment, the routing management component 126 can make the modified routing information available, such as through the generation of centralized routing information.

Figure 4A:
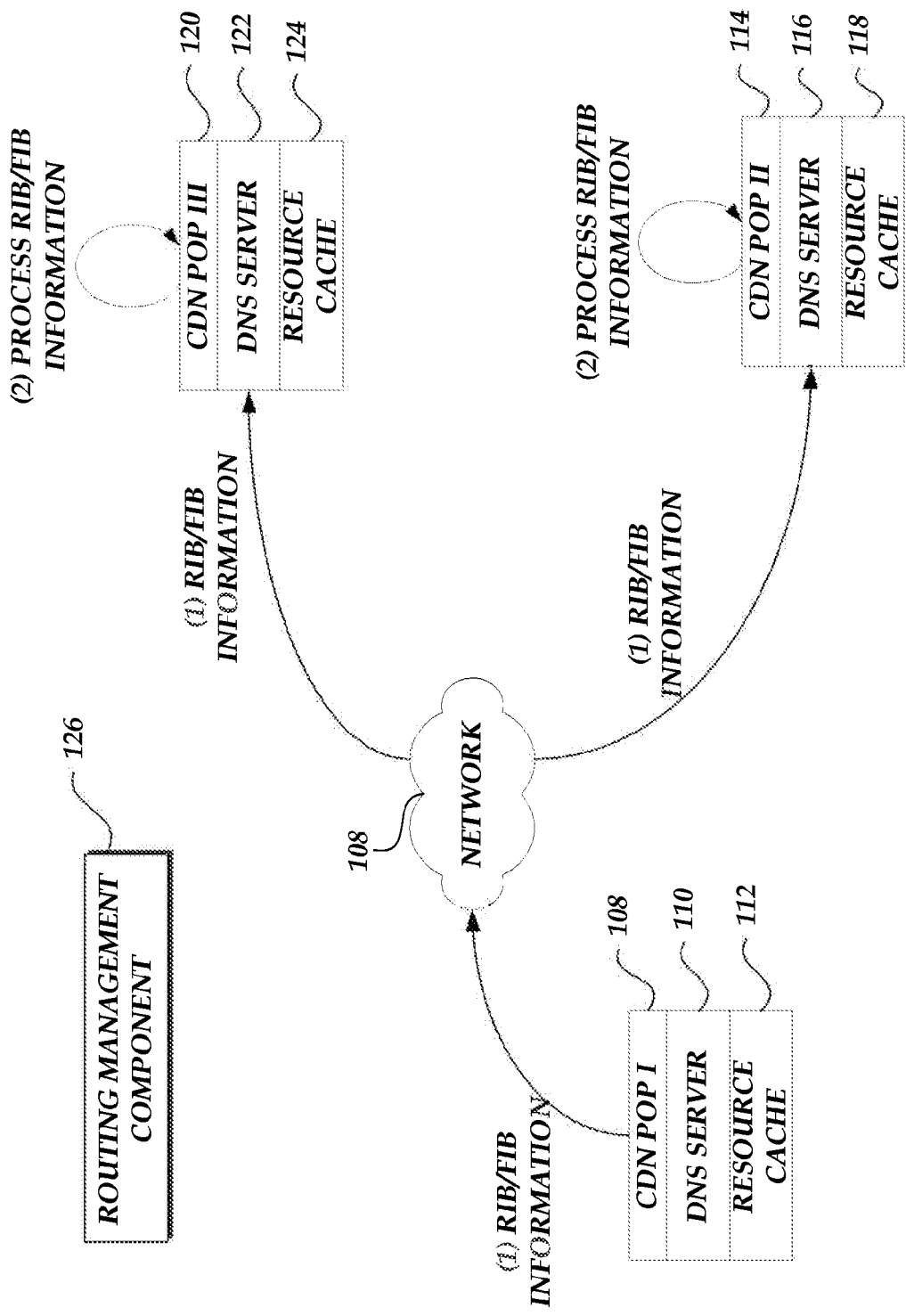
FIGS. 4A and 4B block diagrams of the packet routing environment of FIG. 1 illustrative of the processing of packet routing information.
Figure 4B:
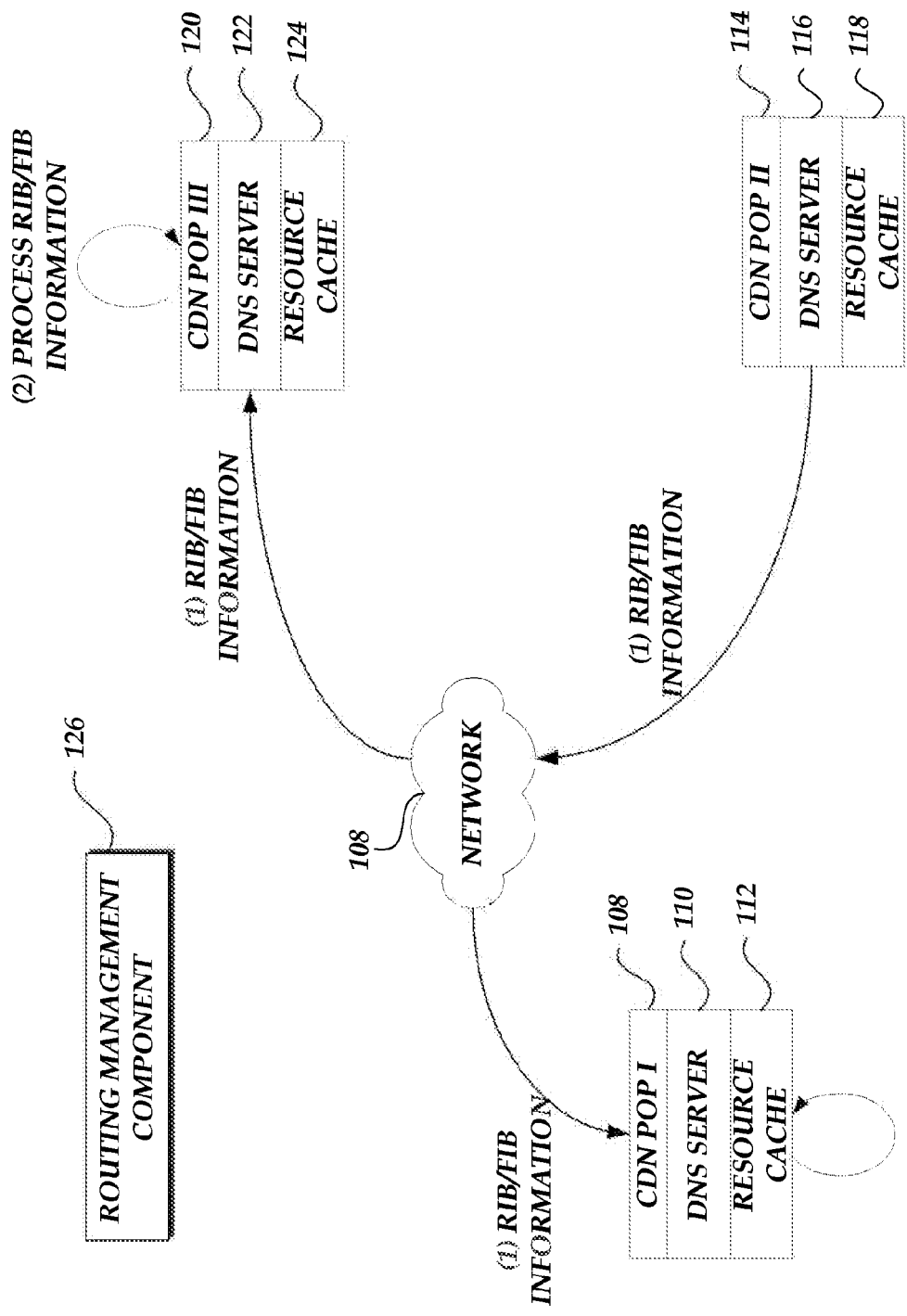

With reference now to FIGS. 4A and 4B, in an alternative embodiment, the POPs can exchange the routing information directly with other POPs. As illustrated in FIG. 4A POP 108 transmits its updated information to the other POPs 114, 120. As illustrated in FIG. 4B, POP 114 transmits its updated information to the other POPs 108, 120. By utilizing a peer-to-peer type configuration, the POPs can update and modify individual routing tables for itself or one or more of its peer POPs. As will be explained in greater detail below, each POP can process the received routing information (or changes/modifications) and apply conflict resolution in the event that various POPs report modifications or have different values for the routing information. Additionally, the POPs can determine when to update its own routing tables or when to distribute updated routing tables to its peers in a manner as described above.

Figure 5:
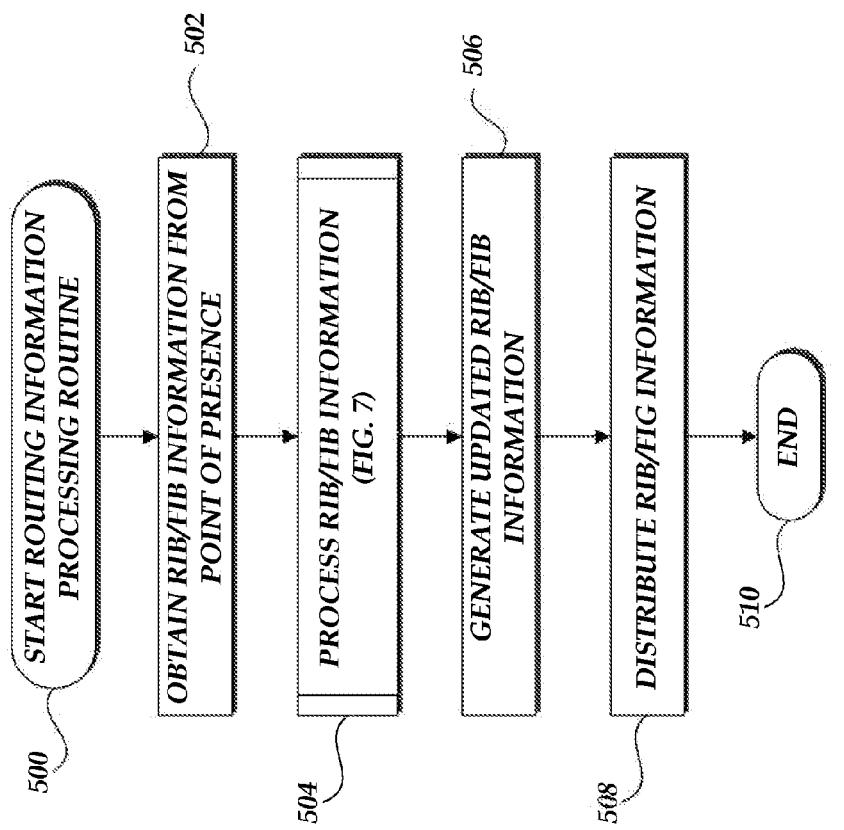
FIG. 5 is a flow diagram illustrative of a packet routing information processing routine implemented by a content delivery service provider.
Figure 6:
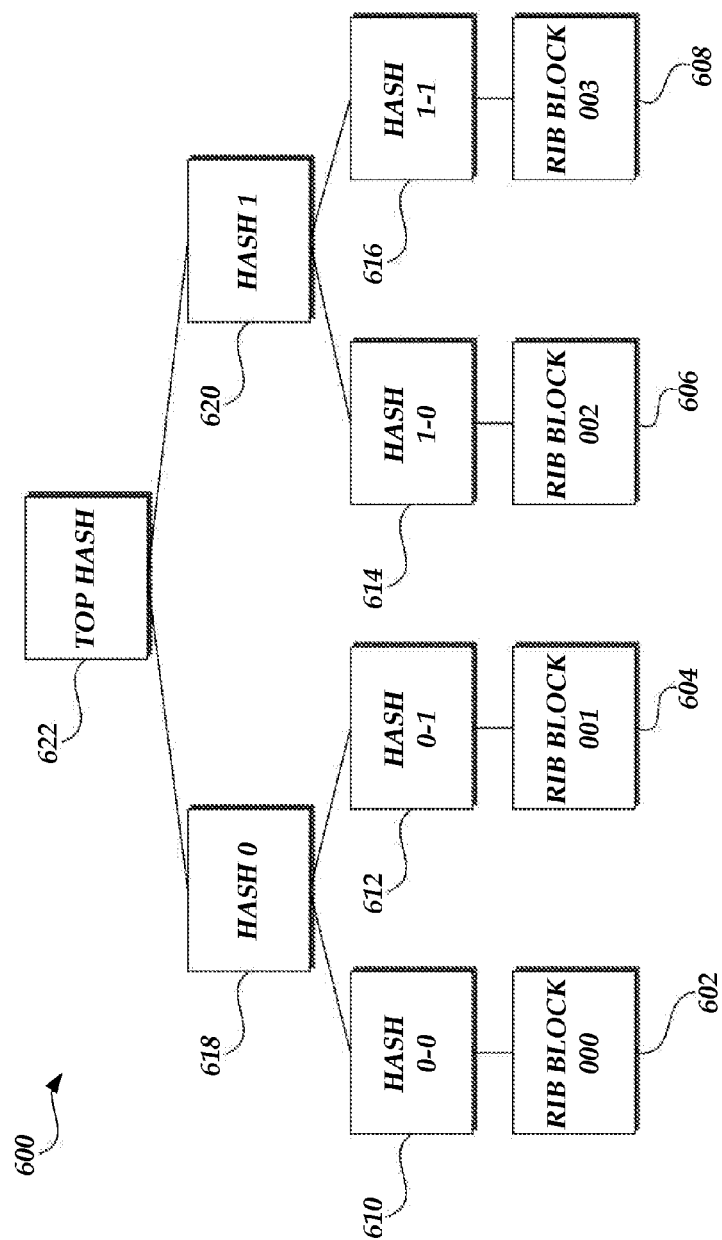
FIG. 6 is a block diagram illustrative of a hash tree corresponding to packet routing information.

With reference now to FIG. 5, a packet routing information processing routine 500 implemented by the CDN provider 106 will be described. One skilled in the relevant art will appreciate that actions/steps outlined for routine 500 may be implemented by one or many computing devices/components that are associated with the CDN service provider 106, such as the routing management component 126 (FIG. 6). Additionally, one or more POPs associated with the CDN service provider 106 may also implement one or more aspects of routine 500. Accordingly, routine 500 has been logically associated as being performed by the CDN service provider 106.

At block 502, the CDN service provider 106 obtains routing information from one or more POPs associated with the CDN service provider or other computing devices that are configured to transmit routing information to the CDN service provider. As previously described, the POPs may transmit the routing information on a periodic basis or upon receiving a request from the CDN service provider 106, such as from the routing management component 126. Additionally, the POPs may transmit routing information based on an update or modification to the locally stored (or locally accessed) routing information. Alternatively, the POPs may transmit routing information based on satisfying a threshold amount of updates/modifications to the locally stored (or locally accessed) routing information or upon detection of a modification to classes or types of routing information. For example, a POP may have logic configured to transmit routing information based on modifications or updates to a percentage of the routing information (e.g., 10% or above). In another example, a POP may have logic configure to transmit routing information based on modifications or updates reflective of a failure of any portion of a communication network. In this example, the POP may not transmit the routing information, for example, if the cost information has been changed. One skilled in the relevant art will appreciate that additional or alternative logic or criteria may also be utilized in conjunction with the transmission of routing information from POPs to the CDN service provider 106.

In an illustrative embodiment, the routing information transmitted from POPs to the CDN service provider 106 corresponds to the RIB tables or FIB routing tables utilized by the POPs. The routing information can also include information representative of the routing information that facilitates the identification of updated routing tables by the routing management component 126. Still further the routing information can include information corresponding to the cause of the transmission, processing results for the routing information, and various combinations thereof. In embodiments in which the POPs are transmitting routing information, the POPs may selectively transmit only portions that have been modified or updated or otherwise prioritize the transmission of those portions that have been modified or updated. With regard to the information representative of the routing information, in one embodiment, the POPs can utilize a hash tree, or Merckle tree, representative of the routing information. An illustrative example of a hash tree of routing information will be described below. Illustratively, the routing information transmitted by the POPs corresponds to the routing information as utilized by the particular POP (or historical routing information). Alternatively, the POPs may process at least a portion of the routing information in the manner utilized by the routing management component 126, other POPs or any other component associated with the CDN service provider 106.

At block 504, the CDN service provider 106 processes the routing information transmitted by the POPs. An illustrative sub-routine 700 for processing routing information will be described with regard to FIG. 7. Illustratively, the processing of the routing information can include the identification of updates to a RIB, FIB or other routing table based on the individual modifications/experiences of the POPs. For example, a specific POP may experience a degradation of a portion of the communication network prior to the communication that the network is overloaded or otherwise unavailable. The processing of the routing information can include an identification of modifications to routes/routing information to avoid this portion of the communication network for all POPs, a subset of POPs, or an individual POP. In another example, one or more POPs may be reporting degradation of a portion of the communication network. The processing of the routing information can include the addition of routes and modification of values attributed to routes to allow other network components to assume routing of data packets to relieve the overloaded portion of the data network or otherwise be able to assume responsibility for routing in the event the portion of data network becomes unavailable.

The processing of the routing information can further include some type of conflict resolution in the event that multiple POPs are reporting different status/updates for the same portion of the communication network. In one aspect, weighting may be given for POPs or other components based on previous experience/reporting, roles within the communication network, or basis for the status/update. For example, a POP that exchanges a higher volume of data packets with a portion of the communication network will have a higher priority than a POP that exchanges a minimal amount of data packets with the same portion of the communication network. In another aspect, the CDN service provider 106 may also utilized time information associated with the routing information to determine the relative timeliness of the routing information updates/modifications.

At block 506, the CDN service provider 106 generates an update to the routing information, such as RIBs, FIBs, or other routing tables, based on the processed routing information. Illustratively, the routing management component 126 may modify the routing tables maintained for each of the POPs according to the processed receiving routing information, including the generation of customized routing information, such as FIBs, that may be utilized by specific POPs or groups of POPs.

At block 508, the CDN service provider 106 distributes the generated routing information. In one embodiment, the CDN service provider 106 may transmit the generated routing information to all the POPs. In other embodiments, the CDN service provider 106 may transmit information selectively based on a determined need for the routing information (e.g., FIBs) or based on registration information provided by the POPs (or otherwise configured for a POP). In one embodiment, the selective distribution by the routing management component 126 may be based on weighing factors associated with the receipt of the routing information from the POPs in terms of a trust level associated with the information. For example, updated routing information associated with a non-trusted POP or other computing device may not be widely distributed until the modifications are independently verified. In another embodiment, the selective distribution may be based on weighing factors associated with time-based or geographic-based criteria. For example, updated routing information may be selectively transmitted based on a combination of geographic grouping of POPs and according to a time schedule such that the updated routing tables are progressively transmitted over a defined period of time (e.g., East Cost to Midwest to West Coast or Europe to North America to Asia). One skilled in the relevant art will appreciate that additional or alternative weighing factors may also be applied.

In a further embodiment, the CDN service provider 106 may distribute the generated routing information by publishing (or otherwise making available) the routing information via the communication network 108. In this embodiment, the generated routing information may function as a "virtual" RIB or "virtual" FIBs that can be accessed or copied by the POPs. At block 510, the routine 500 terminates.

With reference now to FIG. 6, in an illustrative embodiment, the POPs can transmit information representative of the routing information to the CDN service provider 106. In one embodiment, the information representative of the routing information can be in the form of a hash tree. FIG. 6 is a block diagram illustrative of a hash tree 600 corresponding to packet routing information. Generally described, the hash tree 600 includes multiple levels of information based on some underlying data blocks, in this case the routing information maintained by the POPs. As illustrated in FIG. 6, in the illustrative embodiment, the underlying data corresponds to data blocks of the routing information 602, 604, 606 and 608. One skilled in the relevant art will appreciate that the routing information would include a larger number of data blocks. Accordingly, the hash tree 600 illustrated in FIG. 6 is representative of at least a portion of the hash tree.

The hash tree 600 includes a first level of information corresponding to hash of the data blocks 602-608 as represented in block 610,612, 614 and 616. Illustratively, the first level blocks 610-616 have one to one relation to the underlying data blocks 602-608. One skilled in the relevant art will appreciate that any one of a number of hashing algorithms or methodologies may be utilized to generate the hashes in blocks 610-616. In a next level of the hash tree, block 618 corresponds to a hash of blocks 610 and 612 and block 620 corresponds to a hash of blocks 614 and 616. The hash values in blocks 618 and 620 can utilize the same or alternative hashing algorithms utilized in the previous level. In a next level, illustratively the highest level of the hash tree 600, block 622 corresponds to a hash of blocks 618 and 620. The hash value in block 622 can utilize the same or alternative hashing algorithms utilized in the previous levels of the hash tree 600.

One skilled in the relevant art will appreciate that hash tree facilitates the determination of which data blocks have been modified by comparison of the hash tree of the current version of the underlying data with a hash tree of the previous version of the underlying data. For example, if the top most hash value (e.g., block 622) is the same for current and past versions, the underlying data has not been modified and need not be transmitted. If the top most value is not the same, the CDN service provider 106 can then look to the next level to determine which of the branches of the hash tree 600 are indicative of a change. For example, if a comparison of block 618 indicates no change between the current and previous versions, the CDN service provider 106 can quickly determine that any underlying data corresponding to block 618 has not been modified and can be skipped for further analysis. Although illustrated as a three-tiered tree, one skilled in the relevant art will appreciate that a hash tree can have any number of levels to accommodate the number of data blocks in the underlying routing data.

Figure 7:
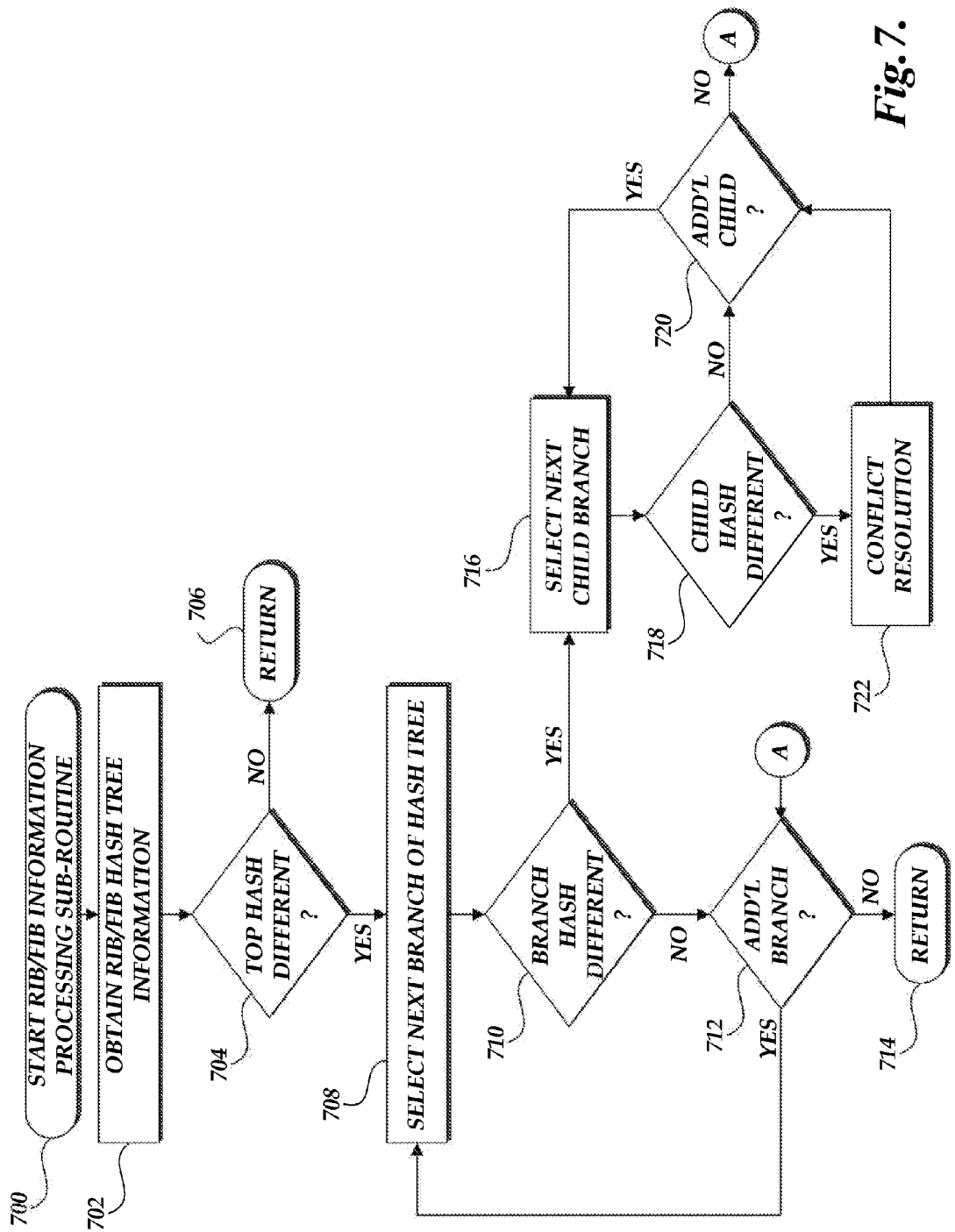
FIG. 7 is a flow diagram of a packet routing processing sub-routine implemented by a content delivery service provider.

With reference now to FIG. 7, a packet routing information processing sub-routine 700 implemented by the CDN provider 106 will be described. Sub-routine 700 can correspond to an implementation of block 504 (FIG. 5) and will be illustrated specifically with regard to the processing of hash tree information to process routing information. One skilled in the relevant art will appreciate that actions/steps outlined for sub-routine 700 may be implemented by one or many computing devices/components that are associated with the CDN service provider 106, such as the routing management component 126 (FIG. 6). Additionally, one or more POPs associated with the CDN service provider 106 may also implement one or more aspects of sub-routine 700. Accordingly, sub-routine 700 has been logically associated as being performed by the CDN service provider 106. Still further, sub-routine 700 may be repeated multiple times based on the number of POPs providing information.

At block 702, the CDN service provider 106 obtains routing information hash tree information. Illustratively, the CDN service provider 106 has a hash tree of the previous version of the routing information that will be compared with the current version of the hash tree. The hash tree information may be calculated in advance by the POP or the CDN service provider 106 or otherwise stored and recalled from memory. An example of hash tree information was previously described in FIG. 6. At decision block 704, a test is conducted to determine whether a top most hash block of the current and previous version match. If so, the routing information is not different and the sub-routine 700 returns at block 706. The CDN service provider 106 may provide an indication of the comparison so that remaining portions of the processing routine, such as routine 500, can be omitted.

If the top most hash blocks are different, at block 708, the CDN service provider 106 selects the next branch in the hash tree. Illustratively, the next branch can corresponds to the level immediately below the top hash block. The determination of the next branch can identify branches from a left to right order or by an order identified in the hash tree. At decision block 710, the CDN service provider 106 determines whether the hash block in the next branch corresponding to the current version has a different value from the same block from the previous version. If not, at decision block 712, a test is conducted to determine whether any remaining branches exist. If so, the sub-routine 700 returns to block 708 to select the next branch in the hash tree. Alternatively, if no remaining branches exist, the sub-routine 700 returns at block 714.

Returning to decision block 710, if the hash block of the current version is different from the same hash block corresponding to the previous version, at block 716, the CDN service provider 106 selects the next child branch for the hash block. At decision block 718, a test is conducted to determine whether the hash block from next child branch and corresponding to the current version is different from the same hash block corresponding to the previous version. If not, at decision block 720, a test is conducted to determine whether additional children branches exist. If so, the sub-routine 700 returns to block 716 for the selection of the next child branch. If no children exist, the sub-routine 700 returns to decision block 712 for a determination of whether additional branches exist to compare.

If at decision block 718 a determination is made that the hash block different values, at block 722, the CDN service provider 106 conducts conflict resolution. In this illustrative embodiment, the examination of the second level of the hash tree (as illustrated in FIG. 6) corresponds to a comparison of a one to one mapping of hash blocks to the underlying data. In other embodiments incorporating hash tree having a different number of levels, additional processing may be conducted prior to examining the hash blocks having a one to one mapping. As previously described, in one aspect, weighting may be given for POPs or other components based on previous experience/reporting, roles within the communication network, or basis for the status/update. For example, a POP that exchanges a higher volume of data packets with a portion of the communication network will have a higher priority than a POP that exchanges a minimal amount of data packets with the same portion of the communication network. In another aspect, the CDN service provider 106 may also utilized time information associated with the routing information to determine the relative timeliness of the routing information updates/modifications. The sub-routine 700 then returns to decision block 720 to determine whether additional children exist.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a physical data store maintaining routing information of a first computing device; and
   a processor in communication with the physical data store, the processor configured to:
      receive, from a second computing device, routing information of the second computing device;
      process the received routing information to identify a distinction between the received routing information of the second computing device and the maintained routing information of the first computing device;
      determine, based at least in part on the identified distinction, a third computing device to receive information corresponding to the identified distinction between the received routing information of the second computing device and the maintained routing information of the first computing device; and
      transmit the information corresponding to the identified distinction between the received routing information of the second computing device and the maintained routing information of the first computing device to the determined third computing device.

2. The system of claim 1, wherein the first computing device is included within a point of presence.

3. The system of claim 1, wherein the routing information comprises at least a portion of a routing table.

4. The system of claim 1, wherein the processor is further configured to update the routing information of the first computing device based at least in part on the identified distinction.

5. The system of claim 4, wherein the processor is configured to update the routing information of the first computing device based at least in part on generation of a forwarding information base.

6. The system of claim 1, wherein transmission of the information corresponding to the identified distinction includes making the updated current version of the routing tables available via a communication network.

7. The system of claim 1, wherein the processor is further configured to:
   receive routing information of an additional computing device; and
   process the received routing information of the additional computing device to identify a distinction between the received routing information of the additional computing device and the maintained routing information of the first computing device; and
   wherein the third computing device is further determined based at least in part on the distinction between the received routing information of the additional computing device and the maintained routing information of the first computing device.

8. A computer-implemented method comprising:
   as implemented by a first computing device based at least in part on specific computer-executable instructions,
      receiving, at the first computing device, routing information of a second computing device;
      processing the received routing information to identify a distinction between the received routing information of the second computing device and routing information maintained by the first computing device;
      determining, based at least in part on the identified distinction, a third computing device to which to transmit an indication of the identified distinction between the received routing information of the second computing device and the routing information maintained by the first computing device; and
      transmitting the indication of the identified distinction between the received routing information of the second computing device and the routing information maintained by the first computing device to the determined third computing device.

9. The computer-implemented method of claim 8, wherein the received routing information comprises a hash tree.

10. The computer-implemented method of claim 9, wherein the hash tree is representative of a routing table of the second computing device.

11. The computer-implemented method of claim 9, wherein processing the received routing information comprises comparing the hash tree within the received routing information with a hash tree representative of the routing information maintained by the first computing device.

12. The computer-implemented method of claim 8, wherein the identified distinction represents a modification to a current version of the routing information maintained by the first computing device.

13. The computer-implemented method of claim 8 further comprising updating the routing information of the first computing device based at least in part on the identified distinction.

14. Non-transitory computer-readable storage media including computer-executable instructions that, when executed by a processor of a first routing device, cause the first routing device to:
   receive routing information of a second routing device;
   process the received routing information to identify a distinction between the received routing information of the second computing device and routing information maintained by the first routing device;
   determine, based at least in part on the identified distinction, a third routing device to which to transmit an indication of the identified distinction between the received routing information of the second computing device and the routing information maintained by the first routing device; and
   transmit the indication of the identified distinction between the received routing information of the second computing device and the routing information maintained by the first routing device to the determined third routing device.

15. The non-transitory computer-readable storage of claim 14, wherein the third computing device is further determined based at least in part on a trust level associated with receipt of the routing information of the second computing device.

16. The non-transitory computer-readable storage of claim 14, wherein the third computing device is further determined based at least in part on at least one of time-based or geographic-based criteria.

17. The non-transitory computer-readable storage of claim 14, wherein the first computer-executable instructions further cause the first routing device to update the routing information of the first routing device based at least in part on the identified distinction.

18. The non-transitory computer-readable storage of claim 14, wherein the received routing information further comprises routing information of an additional computing device.

19. The non-transitory computer-readable storage of claim 14, wherein the first computer-executable instructions cause the processor to process implementing conflict resolution between the routing information of the second computing device and the routing information of the additional computing device by associating a weight to the routing information of the second computing device and associating a weight to the routing information of the additional computing device.

20. The computer-implemented method of claim 19, wherein the assigned weights are based on at least one of a previous history of the individual computing devices, an amount of traffic processed by the individual computing devices, or an assigned priority of the individual computing devices.

\* \* \* \* \*